April 2, 1935. P. G. WILLETTS 1,996,266
GLASS TANK FURNACE AND BLOCK THEREFOR
Filed Dec. 15, 1923
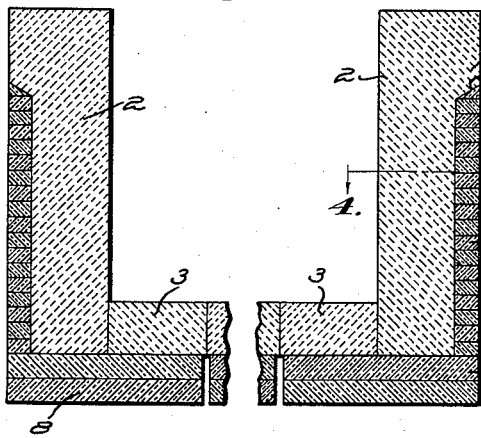
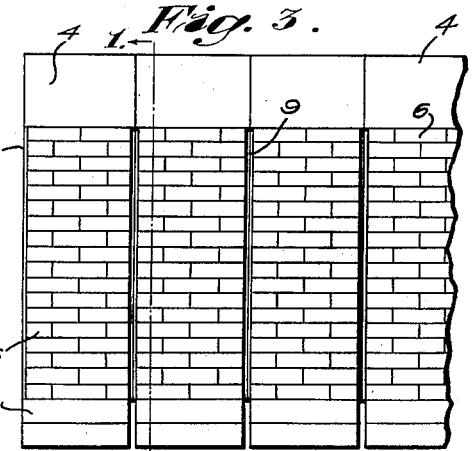
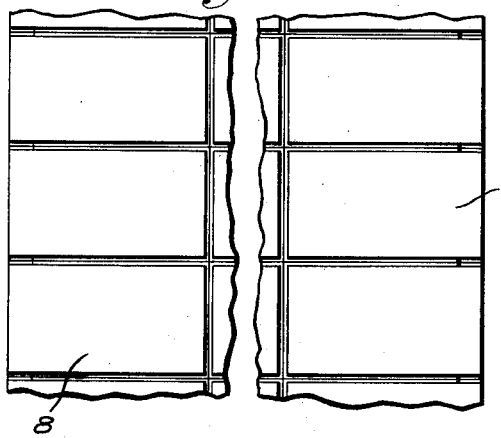
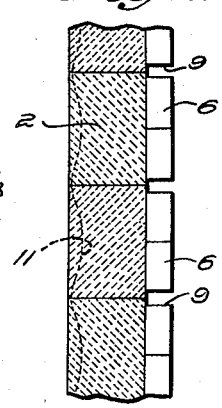
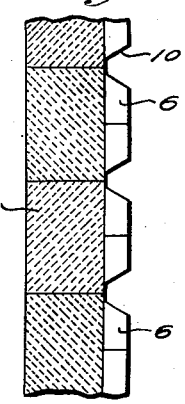
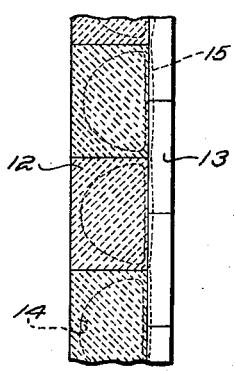
Inventor:
Paul G. Willetts.
by Robins & Brown
Attorney Patented Apr. 2, 1935

1,996,266

UNITED STATES PATENT OFFICE 1,996,266

GLASS TANK FURNACE AND BLOCK THEREFOR

Paul G. Willetts, West Hartford, Conn., assignor to Hartford - Empire Company, Hartford, Conn., a corporation of Delaware Application December 15, 1928, Serial No. 326,334

5 Claims. (Cl. 49—54)

My invention relates to glass tank furnaces and to the blocks from which such furnaces are constructed. One of its objects is to improve the construction of such furnaces by providing means for effectively insulating the walls of the furnace without permitting access of the glass to the side and outer faces of the blocks composing the walls. I accomplish this improved result by applying insulation to the outside surfaces of the blocks composing the tank walls, the insulation, however, being interrupted along the seams between the blocks, and the exposed seams being artificially cooled, if desired, by means of air blasts or otherwise, so as to insure solidification of the glass penetrating between the blocks.

Another object of my invention is to provide an improved block for the side walls of glass furnaces having extra thickness at the part of the block which is to be at the metal line of the furnace, so as to balance the wearing away of the block at the metal line where the wear is always greatest. The extra thickness of the block is preferably provided in the form of an enlargement extending outwardly from the top of the block, leaving the glass-engaging surface smooth and even.

It has long been recognized that glass tank furnaces have extremely low heat efficiency, and it has been proposed to insulate the walls of tank furnaces. Difficulties have been encountered, however, even with the use of extremely high grade refractory blocks, because the molten glass penetrates between and around the blocks when insulation is applied to the walls of the tank, thus exposing several faces of each block to the corrosive action of the molten glass and, therefore, reducing the effective life of the blocks. This happens particularly when the blocks have high heat-transmitting capacity, and therefore become heated throughout to a temperature above the molten temperature of the glass. If the blocks are lighter than the molten glass, the further difficulty is encountered that some of the blocks may be dislodged by floating in the glass.

According to my present invention, substantially all the advantage of insulating a glass tank is obtained without the disadvantages mentioned above, because the interruption of the insulation along the seams between the blocks permits the glass to solidify in the seams, as is usual in ordinary glass tanks, thus confining the wear of the blocks to their glass-engaging inner surfaces.

The application of insulation to the blocks of glass tank furnaces in the manner described above, has the further effect of changing the manner in which the molten glass attacks the blocks. In a fully insulated or uninsulated tank wall, the blocks are worn away most at their corners adjacent to the seams between the blocks, with the result that the blocks, as they wear away, become convex on their inner surfaces in contact with the main body of molten glass, and the surface of each block exposed to the eroding action of the glass is thus progressively increased. If the blocks are fully insulated, erosion takes place on all of the side faces of the blocks, transforming each block, in effect, into an island surrounded by molten glass.

When the blocks are insulated according to the present invention, with the seam portions exposed and kept cool, the eroding action is reversed and each block becomes concave on its inner surface exposed to the glass. Such concave surface, while somewhat greater in area than the original flat surface of the block, is nevertheless very much less than the enlarged surface area produced by the erosion of uninsulated or fully insulated blocks.

In constructing a tank furnace according to my present invention, the side walls of the furnace are preferably composed of a single course of blocks, and the blocks composing the side walls preferably have their upper ends enlarged outwardly, as indicated above, so as to present a vertical inner wall to contact with the glass, and an outwardly extending projection at the top of the block. The enlarged portion of the block presents a relatively large mass of material to the glass at the metal line where the erosion is always the greatest. Below this enlargement each block is preferably insulated by panels of insulated material extending within a short distance, suitably one-quarter of an inch, of the side and bottom edges of the block. The bottom of the tank is preferably inset with respect to the side walls, so that no horizontal seam is presented at the junction of the side walls and the bottom, and the blocks composing the bottom of the tank may be insulated, like the side walls, by panels of insulation extending nearly to the seams of the bottom blocks, but not spanning the seams.

In the accompanying drawing:

Figure 1 is a fragmentary and somewhat diagrammatic vertical sectional view showing a portion of the side walls and bottom of a glass tank furnace constructed in accordance with my invention, the section being taken on the line 1—1 of Fig. 3;

Fig. 2 is a bottom plan view of the structure shown in Fig. 1;

Fig. 3 is a side elevational view of the structure shown in Figs. 1 and 2;

Fig. 4 is an enlarged fragmentary horizontal sectional view on the line 4—4 of Fig. 1;

Fig. 5 is a fragmentary sectional view similar to Fig. 4, showing a modified arrangement of the insulation adjacent to the seams between the blocks, and Fig. 6 is another fragmentary horizontal sectional view, similar to Figs. 4 and 5, but showing the manner in which fully insulated blocks may be eroded.

In the drawing, the numerals 2 indicate a series of blocks composing the side walls of a tank furnace, and the numerals 3 indicate the blocks composing the bottom of the furnace. The side and bottom blocks may be of any convenient size. Each of the side blocks 2 has an enlarged top portion 4 which may be connected with the body portion of the block by an inclined surface 5.

Each of the side blocks is insulated by means of insulating panels 6 which may be composed of any suitable heat-insulating material, suitably such as is described in my Patent No. 1,374,538, dated April 12, 1921. If desired, the insulating material may be formed on the outer surfaces of the blocks during their manufacture, instead of being applied in separate panels, as shown.

As best shown in Fig. 3, the insulation on each block extends nearly to the edge of the block, leaving an exposed space around the edges of the block suitably about one-quarter of an inch wide. An exposed space one-half inch wide is thus left between the insulation upon two adjoining blocks. The seams between the blocks are thus left exposed to the outer air and air blasts may be blown against the exposed seams so as to insure the freezing of the glass between the blocks. The enlargements 4 of the blocks are preferably not insulated and may be cooled by means of air blasts to minimize corrosion at the metal line.

The bottom blocks, as shown, are insulated by means of insulating panels 8 extending nearly to the seams of the bottom blocks, but not spanning such seams. It is not ordinarily necessary to cool artificially the seams between the bottom blocks.

The side and bottom blocks are preferably laid up in place without luting, although suitable luting material may be employed, if desired, particularly if the blocks employed are so irregular as not to match closely together.

In Figs. 3 and 4 the insulating panels are shown with straight edges 9, and in Fig. 5, the edges of the insulating panels are beveled as shown at 10, to increase the radiation of heat from the blocks adjacent to the seams.

In Fig. 4 the manner in which the blocks with exposed seams are eroded is indicated by the dotted lines 11. It will be observed that the erosion is least at the seams and that the blocks become slightly concave as they wear away. Fig. 6 shows how blocks 12 of relatively high heat conducting capacity are worn away when fully insulated by an insulating layer 13 which spans the seams between the blocks. The dotted lines 14 indicate the contours of the blocks after a considerable period of service, and the wavy dotted line 15 indicates the erosion of the insulating layer 13 by glass penetrating between and around the blocks. It will be seen that each block becomes an island surrounded with molten glass, and that the glass is prevented from escaping from the tank, through the wide spaces between the worn blocks, only by the relatively thin and weak layer 13 of insulation.

The particular structure shown and described herein may be variously modified within the scope of the appended claims.

I claim as my invention:

1. A glass tank furnace composed of a plurality of blocks, each block in the side walls of said tank having the major portion of its outer surface covered with heat-insulating material and the seams between said blocks in the said side walls being exposed to provide recesses overlying the seams, which recesses open directly to the atmosphere at one side.

2. A glass tank furnace composed of a plurality of blocks, set side by side, and insulating material extending over the major portion of all of said blocks and extending nearly to the seams between the blocks, leaving recesses overlying the seams and opening directly to the atmosphere to facilitate the freezing of glass penetrating between said blocks.

3. A glass tank furnace the side walls of which are composed of blocks, each of which consists of a generally rectangular body portion and a lateral enlargement at the upper end of the block, the said enlargement extending outwardly with respect to the glass engaging surface of the block, each of said blocks being backed by a panel of insulating material beneath said enlargement, the panels of the several blocks being spaced from each other to expose the joints between the blocks directly to the atmosphere.

4. A glass tank furnace, the side walls of which are composed of a plurality of blocks, each of said blocks being backed by a panel of insulating material extending from the bottom of the furnace upwardly to a point near the glass line, the said panels being spaced from each other to provide recesses overlying the joints between the blocks, which recesses open at one side to the atmosphere and serve to concentrate the attack of the molten glass on the inner surfaces of the blocks toward the centers thereof.

5. The method of insulating a glass tank furnace composed of a plurality of blocks which comprises covering the major portions of the outer surfaces of each of the said blocks with insulation, and leaving recesses overlying the seams between said blocks which recesses are opened to the atmosphere at one side thereof, to facilitate the freezing of glass penetrating between said blocks and to concentrate the attack of molten glass on the inner surfaces of the blocks toward the centers thereof.

PAUL G. WILLETTS.